United States Patent Office 3,281,483
Patented Oct. 25, 1966

3,281,483
DISPROPORTIONATION OF ALKYL AROMATIC HYDROCARBONS IN THE PRESENCE OF HYDROGEN MORDENITE
Hans A. Benesi, Berkeley, and Isaac Dvoretzky, Orinda, Calif., assignors to Shell Oil Company, New York, N.Y., a corporation of Delaware
No Drawing. Filed Aug. 15, 1963, Ser. No. 302,471
13 Claims. (Cl. 260—672)

This invention relates to a process for the catalytic conversion of hydrocarbons and relates more particularly to a process for the disproportionation of alkylaromatics.

Aromatic hydrocarbons such as benzene, naphthalene and their alkyl derivatives are important raw materials used in the chemical and related industries for the preparation of valuable products. For many years the primary source of such aromatic hydrocarbons was the coal tar industry. More recently, however, the petroleum industry has become a leading source for these materials. This has resulted primarily from the availability of the catalytic reforming process, wherein naphthene hydrocarbons are dehydrogenated to produce a reformate rich in aromatics, and more efficient processes for separating the aromatic hydrocarbons from the reformate.

The supply and demand relationship among the individual aromatic hydrocarbons varies. For example, toluene is often in large supply while benzene is frequently in short supply. To correct imbalances in demand and to provide flexibility, it is a common practice to dealkylate toluene to benzene or alkylnaphthalenes to naphthalene by one of the many and well known dealkylation processes. Catalytic hydrodealkylation has the disadvantage that methane is a primary product. Methane, of course, is valuable only as fuel and, moreover, its formation is a detriment since expensive means to remove the methane from the circulating hydrogen stream are required. Moreover, large quantities of hydrogen are consumed in the dealkylation process. Hydrogen is often in short supply and is expensive to produce. Another known method of interconverting aromatics is catalytic disproportionation. However, this approach has met with little success because the catalysts are too low in activity or lead to excessive side reactions.

It has now been discovered that alkylaromatics can be disproportionated to less highly alkylated and more highly alkylated aromatics (e.g. toluene can be disproportionated to benzene and higher methylbenzenes) at an elevated temperature by means of a particular crystalline alumino-silicate catalyst of the zeolite type. In accordance with the process of the invention, alkylaromatics having from 7 to about 15 carbon atoms are contacted at a temperature in the range from about 200 to 600° C. and at a weight hourly space velocity of from about 0.1 to 25 with a catalyst comprising a hydrogen form of a crystalline alumino-silicate known as mordenite. In a preferred embodiment, disproportionation of the alkylaromatics is effected in the presence of hydrogen at a pressure in the range from about 100 to 2000 p.s.i. and a hydrogen-to-oil mol ratio in the range from about 1:1 to about 50:1.

Zeolites are porous crystalline alumino-silicates and are well known in the art. Naturaly occurring zeolites are, for example, chabazite, gmelinite, erionite, and faujasite. Zeolites, have rigid three-dimensional anionic networks with intracrystalline channels whose narrowest cross section has essentially a uniform diameter. Zeolites are to be distinguished over crystalline alumino-silicate clays such as bentonite, which have a two-dimensional layer structure, and over amorphous alumino-silicates such as synthetic silica-alumina cracking catalyst, which have a random structure. Synthetic zeolites, designated as Type X and Type A molecular sieves, are commercially available from Linde Company.

The zeolites are composed of alkali or alkaline earth metal oxides, alumina and silica in various proportions. In the case of a given zeolite, the intracrystalline channels, designated as pores, can be varied in size to a certain extent by replacing all or part of the exchangeable cations with other suitable ions by ion-exchange. The zeolites are used for drying and for separating certain hydrocarbon types, and even have been proposed as catalysts for such hydrocarbon conversion reactions as cracking. In general, however, cracking activity of the zeolites is less than that of the conventional amorphous silicaalumina cracking catalyst.

The catalyst employed in the process of this invention is a particular form of zeolite known as mordenite. While mordenite is naturally occurring, a synthetic mordenite known as Zeolon has become available commercially from the Norton Company. Mordenite is characterized by its high silicon to aluminum ratio of about 5:1 and its crystal structure. Compositions of mordenite as given in Kirk-Othmer "Encyclopedia of Chemical Technology," vol. 12, page 297, is $(Ca, Na_2) Al_2Si_9O_{22}6H_2O$. The proposed structure is one in which the basic building block is a tetrahedron consisting of one silicon or aluminum atom surrounded by four oxygens. The crystal is made up of chains of four-and-five-membered rings of these tetrahedra. These four-and-five membered rings are believed to give the structure its stability. The chains are linked together to form a network having a system of large parallel channels interconnected by small cross channels. Rings of 12 tetrahedra form the large channels. Other synthetic zeolites also have such 12-membered rings but they have interconnected cages whereas the mordenite has parallel channels of uniform diameter. For example, synthetic faujasite, which has the formula $Na_3Al_3Si_4O_{14}$, is characterized by a three-dimensional array of pores which consist of 12–13° A. cages interconnected through 8–9° A. windows.

For use as a catalyst in the process of the invention, the sodium form of mordenite is converted to the hydrogen form, which is often referred to as the acid form. Conversion of the sodium form to the hydrogen form is achieved either by the direct replacement of sodium ions with hydrogen ions or by replacement of sodium ions with ammonium ions followed by decomposition of the ammonium form by calcination. At least about 95%, and preferably at least about 99%, of the alkali metal is removed by the ion-exchange. Chemical analysis of the calcined product of the ammonium form of mordenite shows that complete decomposition of the ammonium ion has occurred, yet the X-ray pattern of the product is the same as that of the original ammonium form. Thus, no attack on the crystalline alumino-silicate lattice is detected.

On the other hand, calcination of the ammonium form of other zeolites such as erionite and faujasite destroys the crystalline aluminosilicate lattice. For example, a naturally occurring zeolite known as erionite which has the approximate formula $M_2Al_2Si_7O_{18}$ where M represents exchangeable alkaline and alkaline earth metal ions can be converted to the ammonium form by extensive washing with ammonium nitrate solution. X-ray diffraction films of the product before and after calcination in air at 500° C. indicate that most of the crystalline alumino-silicate lattice is destroyed during calcination to amorphous material. Similarly, a synthetic faujasite denoted as 13X by the manufacturer, Linde Company, and having the formula $Na_3Al_3Si_4O_{14}$, can be converted to the ammonium form. X-ray examination of the decomposition product of the ammonium form of this faujasite shows that extensive destruction of the lattice occurs in this case, also. Again, amorphous material is formed.

The hydrogen form of mordenite is an excellent catalyst for the disproportionation of alkylaromatics such as toluene. Other acidic solids such as silica-alumina cracking catalyst and platinum on halogenated alumina reforming catalyst have little or no activity for the disproportionation of alkylaromatics under similar conditions.

Feed for the process of the invention can be a substantially pure alkylaromatic having from 7 to 15 carbon atoms, mixtures of such alkylaromatic hydrocarbons or hydrocarbon fractions rich in the alkylaromatics. The feed includes mono- and di-aromatics such as alkylbenzenes and alkylnaphthalenes. It is preferred that an alkyl group has no more than 4 carbon atoms. In the disproportionation reaction, the alkylaromatic is converted to higher alkylaromatics and to lower alkylaromatics, including benzene or naphthalene.

The process of the invention is conducted at a temperature in the range from about 200° to 600° C. and preferably from about 300° to 450° C. In general, disproportionation is increased as temperature is increased.

It is preferred to conduct the disproportionation reaction in the presence of hydrogen; however, there is no net consumption of hydrogen in the process. The presence of hydrogen appears to have a beneficial effect on catalyst activity. For example, in the disproportionation of toluene it has been observed that the disproportionation is enhanced by an increase in hydrogen pressure. A hydrogen-to-oil mole ratio from about 1:1 to about 50:1 and preferably from about 5:1 to 25:1 is used. Total pressure is in the range from about 100 to 2000 pounds per square inch gauge (p.s.i.g.) and preferably from about 500 to 1000 p.s.i.g.

The disproportionation reaction is effected over a wide range of space velocities. In general, the process of the invention is conducted at a space velocity in the range from about 0.1 to about 25. Space velocity, as the term is used herein, refers to WHSV and is expressed as weight of feed per hour, per unit weight of catalyst. In general conversion is decreased as space velocity is increased in the range from about 0.5 to 5.

It is often advantageous to incorporate into mordenite catalytic metals or other promoters which enhance catalytic activity and stability. This can be done, for example, by contacting the ammonium form of mordenite with a solution of a salt of the particular metal desired. Where the metal is in the form of a cation, the metal will be incorporated into the mordenite by ion exchange. All or a part of the ammonium ions can be replaced by the metal cations. Where the metal is in the form of an anion, the metal is impregnated onto the catalyst. After the metal has been incorporated into the ammonium form of mordenite, the catalyst is dried and calcined. Metals can be incorporated directly into the hydrogen form of mordenite by impregnation with a metal salt solution.

Metals which can be added to mordenite by ion-exchange or impregnation methods include transitional metals. Metals of Group I–B, such as copper and including silver, Group VI–B (chromium, molybdenum and tungsten) and the iron group metals of Group VIII are preferred. In addition to hydrogen, a wide range of cations such as, for example, the metals Cr, Mn, Fe, Co, Ni, Cu, Ag, Zn and Cd, can be exchanged in the mordenite structure. When catalytic metals are incorporated into the mordenite disproportionation catalyst, from about 0.01% to 20% and preferably 0.1% to 10% by weight is used. Silver and nickel are excellent metals for promoting disproportionation activity of the catalyst.

EXAMPLE I

Activity of the hydrogen form of mordenite for the disproportionation of alkylbenzenes is illustrated by the following results for the disproportionation of toluene. The hydrogen form of synthetic mordenite, denoted as H-mordenite, was used in the form of a powder for the disproportionation of toluene at 400° C., WHSV of 7.8, 1000 p.s.i.g. and a molar ration of hydrogen to feed of 23:1. The H-mordenite had been prepared from the sodium form, Na-Zeolon, manufactured by the Norton Company, by replacing the sodium ion with ammonium ion followed by calcination of the product at 550° C. for 16 hours. The finished catalyst contained only 0.01% by weight sodium. Results are given in Table I. For comparison, Table I also includes the results for two other acidic catalysts: an amorphous silica-alumina cracking catalysts and a platinum reforming catalyst. It can be seen that amorphous silica-alumina is inactive whereas the platinum catalyst hydrogenates the toluene to naphthenes. Platinum apparently is too strong a hydrogenation function for aromatics.

Table I
REACTION OF TOLUENE AT 400° C. OVER ACIDIC CATALYSTS

[Pressure=1,000 p.s.i.g.; WHSV=7.8; molar ratio of $H_2$ to feed=23:1

| Catalyst | Conversion, percent w. | Composition of Exit Stream, percent w. |
|---|---|---|
| H-mordenite | 25 | 10% benzene, 12% xylenes, 1% $C_9$ and $C_{10}$ polymethylbenzenes, 1% cracked products. |
| Silica-alumina [a] | 0.2 | 0.1% benzene, 0.1% xylenes. |
| UOP R-8 [b] | 98 | 95% methylcyclohexane, 3% dimethylcyclopentanes plus ethylcyclopentane. |

[a] American Cyanamid MS–A–3 cracking catalyst.
[b] Universal Oil Products reforming catalyst; 0.8% Pt, 0.3% Cl, 0.3% F.

EXAMPLE II

Disproportionation of ethylbenzene was effected with the powdered hydrogen form of mordenite, prepared as described in Example I, at 300° C., 600 p.s.i.g., a WHSV of approximately 5 and a molar ratio of hydrogen to feed above 10:1. Conversion of the ethylbenzene was 23% w. with 10% w. benzene and 13% w. diethylbenzenes being obtained in the product.

EXAMPLE III

Na-Zeolon, a sodium form of synthetic modernite manufactured by Norton Company, was converted into the ammonium form by ion exchange with ammonium nitrate. A portion of the ammonium form of mordenite was converted into the hydrogen form by calcination at 550° C. A catalytic metal was incorporated into other portions of the ammonium form of mordenite by ion exchange with metal salts having the metal in the form of a cation, followed by calcination at 550° C.

Toluene was disproportionated over each of these catalysts at 400° C., 1000 p.s.i.g., WHSV of 20 and molar ratio of hydrogen to feed of 23:1. Results are given in Table II.

Table II
TOLUENE DISPROPORTIONATION AT 400° C.

[Pressure=1,000 p.s.i.; WHSV=20; molar ratio of $H_2$ to feed=23:1]

| Catalytic Metal | Conversion | Composition of Exit Stream, percent w. | | | |
|---|---|---|---|---|---|
| | | Benzene | Xylenes | $C_9$ and $C_{10}$ Polymethylbenzenes | Cracking Products |
| None | 16 | 7 | 7 | 1 | 1 |
| 5% Ag | 21 | 9 | 10 | 1 | 1 |
| 3% Ni | 33 | 12 | 14 | 2 | 5 |

EXAMPLE IV

Toluene was disproportionated with a catalyst comprising silver (5% w.) incorporated into the ammonium form of mordenite by ion exchange of the $NH_4$ mordenite with a silver salt. The product was calcined at 550° C. for 16 hours. The disproportionation reaction was effected at 400° C., WHSV 2, 1000 p.s.i.g. and a molar ratio of hydrogen to feed of 23:1. Under these conditions toluene conversion of 56% w. was obtained with 94% selectivity to benzene, xylenes and minor amounts of higher polymethylbenzenes. Other acidic solids such as the MS–A–3 cracking catalyst and the R–8 reforming catalyst are inactive for this reaction under these particular conditions. It should be noted that at 400° C., the equilibrium composition calculated from standard free energies of formation is 6.9% o-xylene, 14.5% m-xylene, 6.8% p-xylene, 28.2% benzene and 43.7% toluene. Thus, actual conversion of toluene obtained was the same as the calculated equilibrium conversion.

We claim as our invention:

1. A process for the disproportionation of an alkylaromatic hydrocarbon having from 7 to about 15 carbon atoms per molecule which comprises contacting said alkylaromatic in a disproportionation reaction zone at a temperature in the range from about 200° to about 600° C. with a catalyst consisting essentially of hydrogen mordenite, and recovering from the reaction zone effluent disproportionation products of higher and lower number of carbon atoms than said alkylaromatic.

2. A process for the disproportionation of an alkylaromatic hydrocarbon having from 7 to about 15 carbon atoms per molecule which comprises contacting said alkylaromatic in a disproportionation reaction zone at a temperature in the range from about 200° to about 600° C., a pressure from about 100 to 2000 pounds per square inch, a weight hourly space velocity of from about 0.1 to 25, and a hydrogen-to-oil molar ratio of from about 1:1 to 50:1 with a catalyst consisting essentially of hydrogen mordenite, and recovering from the reaction zone effluent disproportionation products of higher and lower number of carbon atoms than said alkylaromatic.

3. A process for the disproportionation of an alkylbenzene having from 7 to about 15 carbon atoms per molecule which comprises contacting said alkylbenzene in a disproportionation reaction zone at a temperature in the range from about 200° to about 600° C. with a catalyst consisting essentially of hydrogen mordenite, and recovering from the reaction zone effluent disproportionation products of higher and lower number of carbon atoms than said alkylbenzene.

4. The process according to claim 3 wherein the contacting is conducted in the presence of from about 1 to 50 moles of hydrogen per mole of oil at a total pressure in the range from about 100 to 2000 pounds per square inch.

5. A process for the disproportionation of an alkylnaphthalene having from 11 to about 15 carbon atoms per molecule which comprises contacting said alkylnaphthalene in a disproportionation reaction zone at a temperature in the range from about 200° to about 600° C. with a catalyst consisting essentially of hydrogen mordenite, and recovering from the reaction zone effluent disproportionation products of higher and lower number of carbon atoms than said alkylnaphthalene.

6. The process according to claim 5 wherein the contacting is conducted in the presence of from about 1 to 50 moles of hydrogen per mole of oil at a total pressure in the range from about 100 to 2000 pounds per square inch.

7. A process for the disproportionation of an alkylaromatic hydrocarbon having from 7 to about 15 carbon atoms per molecule which comprises contacting said alkylaromatic in a disproportionation reaction zone at a temperature in the range from about 200° to about 600° C. with hydrogen mordenite having incorporated therewith from about 0.01% to 20% by weight of a metal selected from Group I–B, Group VI–B, the Iron Group, and mixtures thereof, and recovering from the reaction zone effluent disproportionation products of higher and lower number of carbon atoms than said alkylaromatic.

8. The process according to claim 7 wherein the metal is silver.

9. The process according to claim 7 wherein the metal is nickel.

10. A process for the disproportionation of alkylbenzene having from 7 to about 15 carbon atoms per molecule which comprises contacting said alkylbenzene in a disproportionation reaction zone at a temperature in the range from about 200° to about 600° C., a pressure of from about 100 to 2000 pounds per square inch, a weight hourly space velocity of from about 0.1 to 25, and a hydrogen-to-oil molar ratio of from about 1:1 to 50:1 with hydrogen mordenite having incorporated therewith from about 0.01% to 20% by weight of a metal selected from Group I–B, Group VI–B, the Iron Group, and mixtures thereof, and recovering from the reaction zone effluent disproportionation products of higher and lower number of carbon atoms than said alkylbenzene.

11. The process according to claim 10 wherein the alkylbenzene is toluene.

12. The process according to claim 11 wherein the metal is silver.

13. The process according to claim 11 wherein the metal is nickel.

References Cited by the Examiner
UNITED STATES PATENTS

| | | | |
|---|---|---|---|
| 3,140,251 | 7/1964 | Plank et al. | 208—120 |
| 3,140,253 | 7/1964 | Plank et al. | 208—120 |
| 3,173,855 | 3/1965 | Miale et al. | 260—672 X |

DELBERT E. GANTZ, *Primary Examiner.*

C. R. DAVIS, *Assistant Examiner.*

Notice of Adverse Decision in Interference

In Interference No. 96,253 involving Patent No. 3,281,483, H. A. Benesi and I. Dvoretzky, Disproportionation of alkyl aromatic hydrocarbons in the presence of hydrogen mordenite, final judgment adverse to the patentees was rendered Dec. 31, 1968, as to claims 1 and 3.

[*Official Gazette March 11, 1969.*]